US011410274B2

(12) United States Patent
Goto et al.

(10) Patent No.: US 11,410,274 B2
(45) Date of Patent: Aug. 9, 2022

(54) INFORMATION PROCESSING DEVICE AND PROGRAM

(71) Applicant: DENSO CORPORATION, Kariya (JP)

(72) Inventors: Hiroaki Goto, Kariya (JP); Hideki Otsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 582 days.

(21) Appl. No.: 16/325,031

(22) PCT Filed: Aug. 15, 2017

(86) PCT No.: PCT/JP2017/029381
§ 371 (c)(1),
(2) Date: Feb. 12, 2019

(87) PCT Pub. No.: WO2018/034287
PCT Pub. Date: Feb. 22, 2018

(65) Prior Publication Data
US 2021/0287335 A1 Sep. 16, 2021

(30) Foreign Application Priority Data
Aug. 15, 2016 (JP) .............................. JP2016-159255

(51) Int. Cl.
G09G 5/00 (2006.01)
G06T 3/40 (2006.01)
B60R 1/00 (2022.01)
G06T 11/00 (2006.01)
H04N 7/18 (2006.01)

(52) U.S. Cl.
CPC .............. *G06T 3/4038* (2013.01); *B60R 1/00* (2013.01); *G06T 11/001* (2013.01); *H04N 7/185* (2013.01); *B60R 2300/303* (2013.01)

(58) Field of Classification Search
CPC ........ G09G 5/14; G09G 1/007; G06F 3/0481; G06T 11/60; G01S 7/06
USPC .......................................................... 345/635
See application file for complete search history.

(56) References Cited

U.S. PATENT DOCUMENTS

2001/0028393 A1    10/2001   Tomida et al.
2012/0026333 A1*    2/2012   Okuyama ............... G06T 5/009
                                                          348/148
2016/0042543 A1*    2/2016   Hashimoto ........ H04N 5/23293
                                                          345/629
2016/0260238 A1*    9/2016   Lang ...................... H04N 7/183

FOREIGN PATENT DOCUMENTS

JP     2001-239882 A    9/2001
JP     2010-018102 A    1/2010

* cited by examiner

Primary Examiner — Gordon G Liu
(74) Attorney, Agent, or Firm — Maschoff Brennan

(57) ABSTRACT

An information processing device includes an image acquisition unit and an image processing unit. The image processing unit generates a composite image including at least two display images as images based on the one or more acquired images acquired by the image acquisition unit and a boundary image displayed at least in a region between the at least two display images. The image processing unit sets a display mode of the boundary image according to predetermined feature amounts of the at least two display images included in the composite image.

6 Claims, 8 Drawing Sheets

FIG.7

| CONDITIONS | | | OUTPUT | | | REMARKS |
|---|---|---|---|---|---|---|
| BRIGHTNESS OF IMAGE | COLOR OF IMAGE | BRIGHTNESS OF BOUNDARY IMAGE | COLOR OF BOUNDARY IMAGE | MODE OF BOUNDARY IMAGE | | |
| BOTH DARK | — | BRIGHT | | SINGLE LAYER | | COLORS ARE ARBITRARY |
| BOTH BRIGHT | — | DARK | | SINGLE LAYER | | COLORS ARE ARBITRARY |
| BOTH DARK | — | | WHITE | SINGLE LAYER | | |
| BOTH BRIGHT | — | | BLACK | SINGLE LAYER | | |
| ONE IS BRIGHT AND THE OTHER IS DARK IN ENTIRE TARGET REGION | — | ARBITRARY (PREVIOUS STATE IS MAINTAINED) | ARBITRARY (PREVIOUS STATE IS MAINTAINED) | SINGLE LAYER | | WITH GREAT DIFFERENCE, TWO IMAGES CAN BE RECOGNIZED AS DIFFERENT REGARDLESS OF MODE OF BOUNDARY IMAGE |
| ONE IS BRIGHT AND THE OTHER IS DARK IN PART OF TARGET REGION | — | — | — | SINGLE LAYER | | PORTIONS OF TWO IMAGES WITH GREAT DIFFERENCE IN BRIGHTNESS ARE EXCLUDED FROM DETERMINATION TARGETS OR DETERMINATION WEIGHT IS LESSENED |
| BOTH DARK | — | — | — | THREE LAYERS (BLACK, WHITE, BLACK) | | MIDDLE ONE IS MADE PROMINENT |
| BOTH BRIGHT | — | — | — | THREE LAYERS (WHITE, BLACK, WHITE) | | MIDDLE ONE IS MADE PROMINENT |
| — | BOTH BLUE | — | YELLOW | SINGLE LAYER | | REVERSE HUE IS SET |
| — | BOTH GREEN | — | VIOLET | SINGLE LAYER | | REVERSE HUE IS SET |
| — | BOTH BLUE | — | — | THREE LAYERS (BLUE, YELLOW, BLUE) | | |
| — | BOTH GREEN | — | — | THREE LAYERS (GREEN, VIOLET, GREEN) | | |
| — | COLORS ARE GREATLY DIFFERENT | — | ARBITRARY (PREVIOUS STATE IS MAINTAINED) | | | WITH GREAT DIFFERENCE, TWO IMAGES CAN BE RECOGNIZED AS DIFFERENT REGARDLESS OF MODE OF BOUNDARY IMAGE |

INFORMATION PROCESSING DEVICE AND PROGRAM

CROSS-REFERENCE TO RELATED APPLICATION

This application is the U.S. national phase of International Application No. PCT/JP2017/029381 filed Aug. 15, 2017 which designated the U.S. and claims priority to Japanese Patent Application No. 2016-159255 filed Aug. 15, 2016, the contents of which are incorporated herein by reference.

TECHNICAL FIELD

The present disclosure relates to a technique for displaying acquired images.

BACKGROUND ART

In the case of displaying a plurality of images shot in different acquiring ranges at the same time on one display device, clarifying the boundary between the displayed images improves visibility for users.

For example, PTL 1 suggests a technique for changing the color of the boundary according to the brightness of the outside of a vehicle.

CITATION LIST

Patent Literature

[PTL 1] JP 2001-239882 A

SUMMARY OF THE INVENTION

The inventor's detailed studies have found an issue that, even when the color of the boundary is changed according to the brightness outside of a vehicle, visibility may not be sufficiently improved in some cases.

In recent years, particularly, the foregoing problem has become more noticeable because acquired images are not displayed as they are, but they may be changed in point of view or only some of them are displayed in many scenes.

The present disclosure desirably provides a technique for improving the visibility of images displayed.

One aspect of the present disclosure is an information processing device including an image acquisition unit, an image processing unit, and an output unit.

The image acquisition unit is configured to acquire images acquired at least one image acquiring device.

The image processing unit is configured to generate a composite image including at least two display images as images based on the one or more acquired images acquired by the image acquisition unit and a boundary image displayed at least in a region between the at least two display images.

The output unit is configured to externally output the composite image generated by the image processing unit.

The image processing unit is configured to set a display mode of the boundary image according to a combination of respective predetermined feature amounts of the at least two display images included in the composite image, and the feature amounts include at least one of a parameter indicating brightness and a parameter indicating color.

According to this configuration, the display mode of the boundary image indicating the boundary between the plurality of display images included in the composite image is set based on the display images.

Accordingly, setting the boundary image in such a manner as to make the display images easy to view improves the visibility of the display images for users.

Another aspect of the present disclosure is a program for causing a computer to implement an image acquisition function, an image processing function, and an output function.

The image acquisition function acquires images acquired at least one image acquiring device.

The image processing function generates a composite image including at least two display images as images based on the one or more acquired images acquired by the image acquisition function and a boundary image displayed in at least a region between the at least two display images.

The output unit outputs the composite image generated by the image processing unit to the outside.

The image processing function sets a display mode of the boundary image according to a combination of respective predetermined feature amounts of the at least two display images included in the composite image, and the feature amounts include at least one of a parameter indicating brightness and a parameter indicating color.

According to this configuration, it is possible to allow a computer to serve as the information processing device described above.

The reference signs in parentheses described in the claims represent the correspondences with the specific units in embodiments described later as one mode of the present disclosure but are not intended to limit the technical scope of the present disclosure.

BRIEF DESCRIPTION OF THE DRAWINGS

FIG. 7 is a table illustrating an example of a method for setting a display mode;

DESCRIPTION OF EMBODIMENTS

Modes for carrying out the present invention will be described below with reference to the drawings.

1. Embodiments

1-1. Configuration

Figure 1:
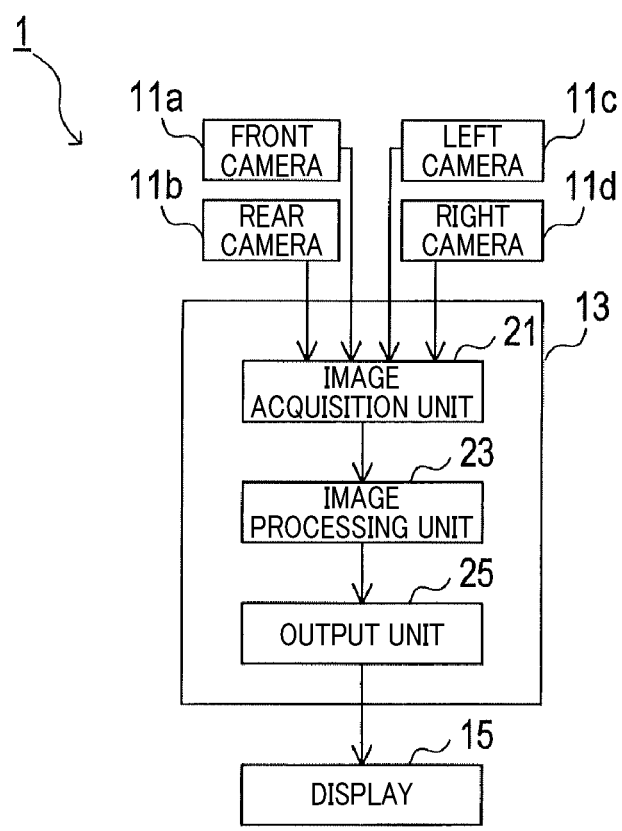
FIG. 1 is a block diagram illustrating a configuration of a display system.

A display system 1 illustrated in FIG. 1 is a system mounted in a vehicle and includes a front camera 11a, a rear camera 11b, a left camera 11c, a right camera 11d, an information processing device 13, and a display 15.

In the following descriptions, the cameras 11 can include the four cameras 11a, 11b, 11c, and 11d.

The cameras 11 are imaging devices provided in a vehicle and can be CCD image sensors or CMOS image sensors, for example.

Each of the cameras acquires the surroundings of the vehicle at predetermined time intervals (for example, 1/15 s) and outputs the acquired images to the information processing device 13.

The front camera 11a, the rear camera 11b, the left camera 11c, and the right camera 11d are disposed to acquire respectively the areas in the front, rear, left, and right of the vehicle.

The cameras 11 are equivalent to a image acquiring device.

Figure 2:
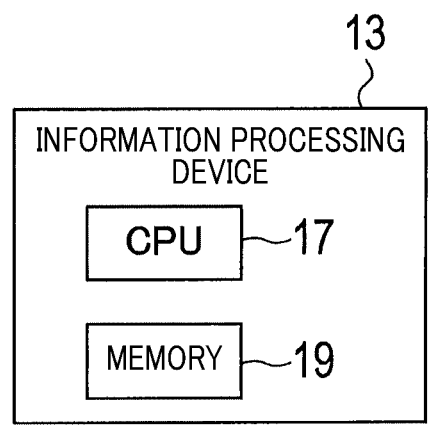
FIG. 2 is a block diagram illustrating a configuration of an information processing device.

As illustrated in FIG. 2, the information processing device 13 includes a microcomputer that has a CPU 17 and a semiconductor memory such as RAM, ROM, flash memory (hereinafter, called memory 19).

Various functions of the information processing device 13 are implemented by the CPU 17 executing programs stored in a non-transitory tangible recording medium.

In this example, the memory 19 is equivalent to the non-transitory tangible recording medium storing the programs.

When any of the programs is executed, the method corresponding to the program is executed.

The information processing device 13 may include one or more microcomputers.

The information processing device 13 includes an image acquisition unit 21, an image processing unit 23, and an output unit 25 as the functions to be implemented by the CPU 17 executing the programs as illustrated in FIG. 1.

The method for implementing the functions included in the information processing device 13 is not limited to software. Some or all of the functions may be implemented by one or more units of hardware.

For example, when the foregoing functions are to be implemented by an electronic circuit as hardware, the electronic circuit may be implemented by a digital circuit, an analog circuit, or a combination of them.

The image acquisition unit 21 acquires acquired images taken by the cameras 11.

The image processing unit 23 generates a composite image described later.

The output unit 25 outputs the composite image generated by the image processing unit 23 to the display 15.

The display 15 is a display device such as a liquid crystal display displaying images, that displays the generated composite image according to a signal input from the information processing device 13.

The composite image can be output to the outside of the image acquisition unit 21, the image processing unit 23, and the output unit 25.

For example, the composite image may be output to a storage device having a storage area capable of storing the composite image and stored in the storage area.

1-2. Composite Image

A composite image generated by the image processing unit 23 will be described.

General Outline of a Composite Image

Figure 3:
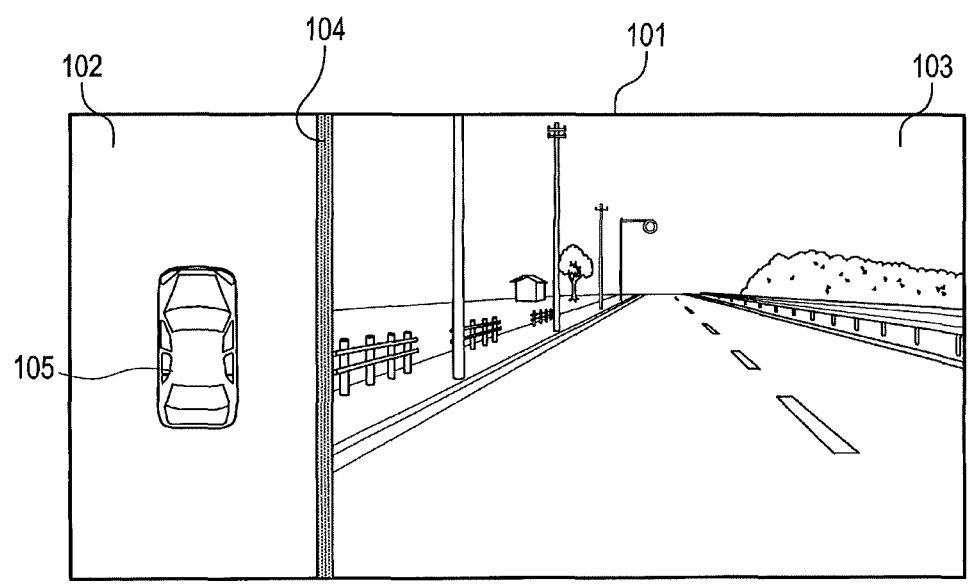
FIG. 3 is a diagram illustrating an example of a composite image.

A composite image 101 illustrated in FIG. 3 is an image including a first display image 102, a second display image 103, and a boundary image 104.

The first display image 102 and the second display image 103 are images different in point of view based on one or more acquired images acquired by the image acquisition unit 21.

In the following descriptions, the display images can include the first display image 102 and the second display image 103 without differentiation between these images.

The first display image 102 is an image in a birds-eye view from above the vehicle 105 and is generated by compositing the acquired images from all the cameras 11.

The vehicle 105 is not acquired the cameras 11 and thus a previously acquired image is used in composition.

The second display image 103 is an image in a view from behind the vehicle and is generated based on the image acquired the rear camera 11b.

The boundary image 104 is an image displayed in a region between the first display image 102 and the second display image 103 to clarify the boundary between the two display images.

The image processing unit 23 sets the display mode of the boundary image 104 such that the boundary between the two display images becomes clear based on the feature amounts of the two display images included in the composite image 101.

Feature Amount

The feature amounts in the present embodiment are parameters of a display image, in other words, parameters determined by specific contents of an image represented by the display image.

The feature amounts are equivalent to "brightness" and "color", for example.

Hereinafter, the feature amounts will be described as "brightness" and "color". However, either one of these parameters may be used as feature amount or a parameter other than these parameters may be used as feature amount.

The brightness as feature amount can be luminance or a parameter calculated from luminance, for example.

Although there is no particular limitation on the method for calculating luminance, R, G, and B levels of one pixel in a display image may be weighted with coefficients and added up, for example.

As a matter of the course, the parameter of brightness is not limited to this but any of various parameters can be used as far as the parameter can specify brightness.

The color as feature amount can be R, G, and B levels or a parameter calculated from these levels, for example.

The parameter of color is not limited to R, G, and B but a parameter represented by a color space of HSV may be used.

For example, hue, lightness, chroma, or others may be used.

Subsequently, the areas on the display images where to acquire the feature amounts will be described.

The feature amounts may be acquired from the entire display images.

On the other hand, when any of the display images includes a plurality of portions greatly different in brightness or color, for example, it would rather be appropriate to acquire the feature amount from a specific portion of the display image.

Accordingly, the target region as a region on the display image where to acquire the feature amount may be set to a predetermined partial region of the display image.

To acquire the feature amount from the predetermined partial region of the display image, it can be considered that the region is set to a region adjacent to the boundary image.

Figure 4:
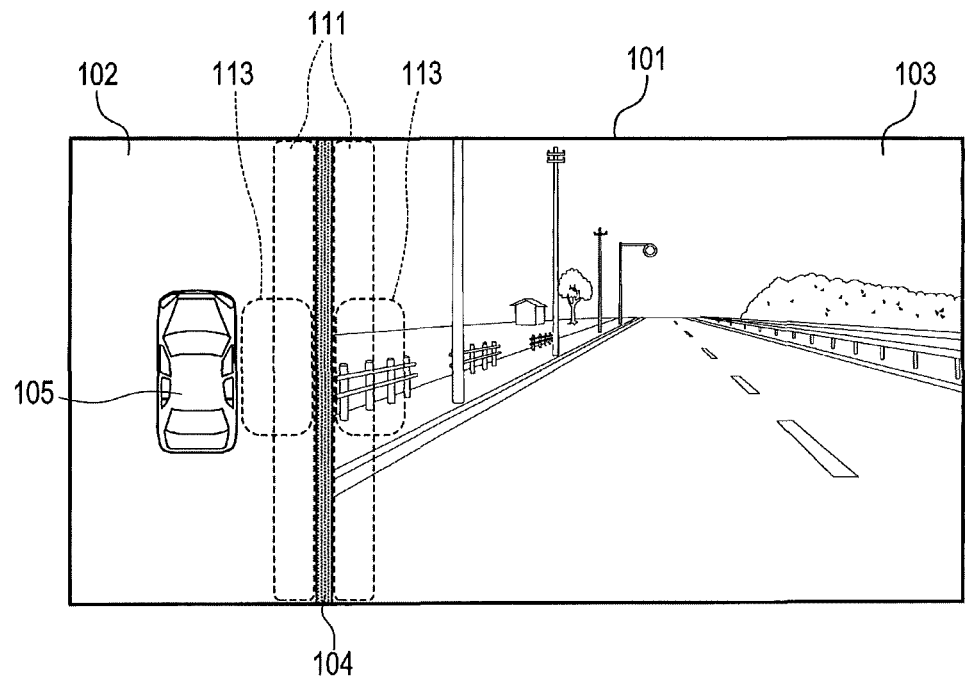
FIG. 4 is a diagram describing regions where feature amounts are to be acquired.

For example, as illustrated in FIG. 4, there are possibly a method for acquiring the feature amounts from neighborhood regions 111 near the boundary image 104 and adjacent to the boundary image 104 and a method for acquiring the feature amounts from central regions 113 as regions adjacent to the boundary image 104 and located in the vertical center of the screen.

When the display images are vertically aligned, for example, the central regions 113 can be set in the horizontal center.

In addition, the feature amounts can be calculated in a plurality of divided regions.

Figure 5:
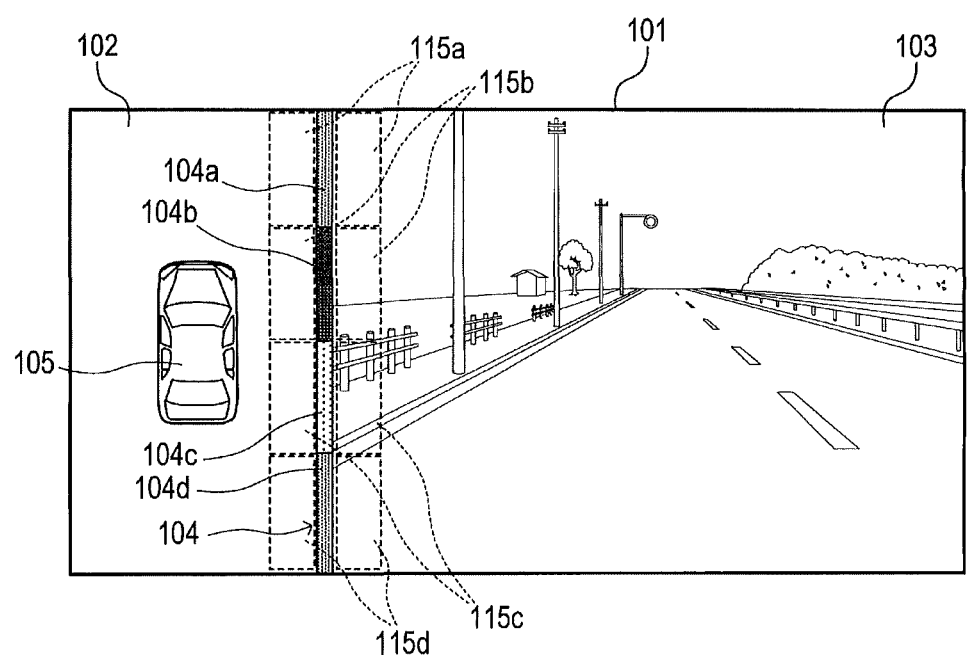
FIG. 5 is a diagram describing regions where feature amounts are to be acquired.

For example, as illustrated in FIG. 5, the regions in the neighborhood of the boundary image 104 and adjacent to the boundary image 104 can be divided in the length direction of the boundary image 104 so that the feature amounts can be calculated in divided regions 115a to 115d.

In this case, for the divided regions, corresponding boundary image elements 104a to 104d can be determined in the boundary image 104.

Based on the feature amounts calculated in the divided regions, the boundary image elements corresponding to the divided regions may change the display mode described later.

The first display image 102 and the second display image 103 may be configured such that the feature amounts are calculated in different target regions by different calculation methods.

In the case of acquiring the feature amount from the entire or partial display image, it is possible to calculate feature amounts in pixels in the target region and calculate the average value to acquire the feature amount.

Alternatively, the feature amounts may not be calculated in all of the pixels in the target region but may be acquired in some of the pixels set as a sample.

To calculate the average value, any of various average values can be used such as arithmetic average, geometric mean, and weighted average.

Instead of using the average value, the feature amount of the pixel set as a representative may be used or the feature amount in the target region may be calculated by a method other than calculating the average.

At the time of calculating the feature amount in the target region based on the feature amounts acquired from a plurality of pixels, weights may be assigned according to the position.

For example, as the degree of importance is higher at a longer distance from the boundary image, a parameter of weight can be set to be larger.

Adding up the feature amounts with consideration given to weights described above makes the feature amounts of the display images preferred as values for use in setting the boundary image.

Display Mode of the Boundary Image

The shape and display color of the boundary image can be set according to the calculated feature amounts.

Figure 6:
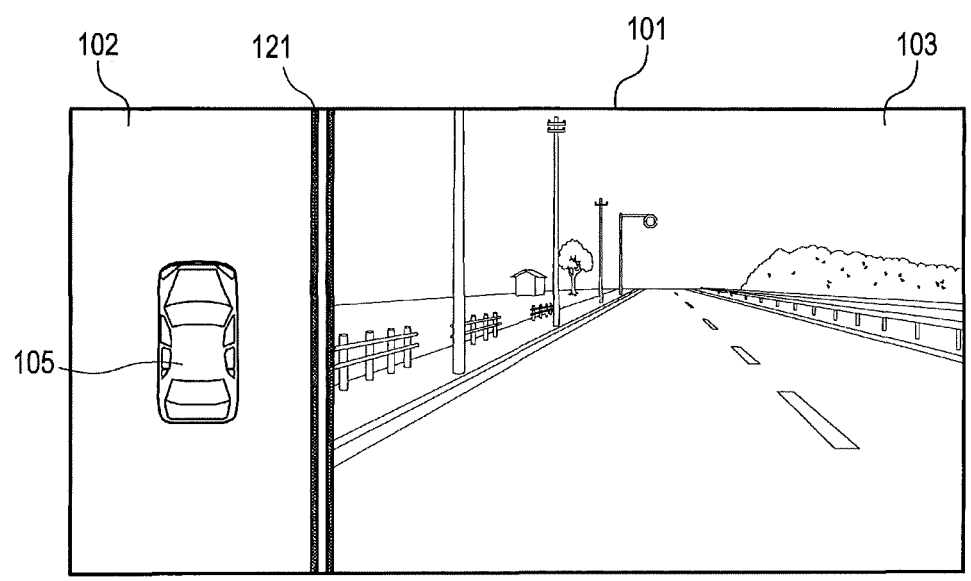
FIG. 6 is a diagram illustrating an example of a boundary region.

For example, as a boundary image 121 illustrated in FIG. 6, the boundary image may have a shape formed by lines having a plurality of layers different in color or a shape formed by lines different in width of the boundary image, for example, a non-linear shape such as a wave shape.

The display color of the boundary image can be set to a color by which the difference from the display images becomes clear according to the acquired feature amounts.

The display color of the boundary image may be changed within the boundary image corresponding to the two display images.

Specifically, the display color may be formed by combining layers of different colors as illustrated in FIG. 6 or the display color may be expressed by stepwise gradations.

An example of a method for setting the display mode of the boundary image will be described.

For example, when both of the two display images are bright at a level equal to or higher than a predetermined threshold, the color of the boundary image can be darkened, and when either of them is not so bright at a level equal to or higher than the predetermined threshold, the color of the boundary image can be set to yellow.

In addition, when both of the two display images are bright at a level equal to or higher than the predetermined threshold, the width of the boundary image can be relatively decreased, and when either of them is not so bright at a level equal to or higher than the predetermined threshold, the width of the boundary image can be relatively increased.

A specific example will be described.

The brightnesses of target regions in two display images are specified by values between lowest 0 and highest 100.

The threshold is set to 50.

When both of the brightnesses of the target regions in the two display image are 50 or more, the color of the boundary image can be darkened, and when either of them is less than 50, the color of the boundary image can be set to yellow.

The above-mentioned case where "both of the two display images are bright at a level equal to or higher than the predetermined threshold" may be the case where "either of them is bright at a level equal to or higher than the predetermined threshold", and the case where "either of them is not so bright at a level equal to or higher than the predetermined threshold" may be the case where "none of them are bright at a level equal to or higher than the predetermined threshold".

The display color and shape may not only be switched between two different settings but may be set in a plurality of steps or may be seamlessly changed according to the feature amounts of the display images at that time.

In addition, the age of a person to view a composite image may be acquired so that the mode of the display can be changed according to the age.

FIG. 7 illustrates a specific example of setting the boundary image.

Rules for setting the boundary image can be as described below.

When the boundary image has three layers, that is, when three colors exist between the two display images, the brightness and color of the outer layers may be set close to the brightnesses and colors of the display images and the brightness and color of the inner layer may be inversely set relative to the brightnesses and colors of the display images so that the inner layer becomes prominent.

When the two display images are greatly different in brightness, the display images can be easily recognized as being different images even without giving prominence to the boundary image and thus no particular processing may be performed.

However, when the regions of the two display images adjacent to each other with the boundary image therebetween have portions with minor differences in brightness and color, these portions may be used as standards for setting the boundary image on a priority basis.

To change gradually the display color of the boundary image, the adjacent portions between the display images and the boundary image may be set to be opposite in hue.

The display color, brightness, and mode of the boundary image may be changed in combination.

The colors of the display images may be determined by hue and the brightnesses of the display images may be determined by luminance.

The display modes and the rules for setting the display modes described above are mere examples and can be modified in various manners as far as they can perform a function of clarifying the boundary between the display images.

1-2. Process

Figure 8:
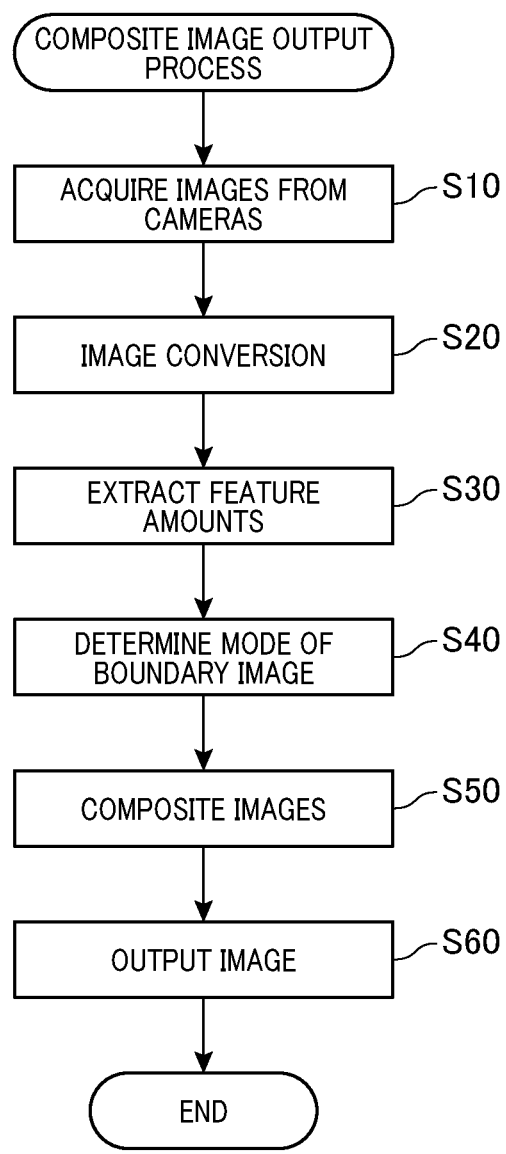
FIG. 8 is a flowchart of a composite image output process.

Next, a composite image output process executed by the CPU 17 of the information processing device 13 will be described with reference to the flowchart of FIG. 8.

In S10, the CPU 17 acquires acquired images of the surroundings of the vehicle from the cameras 11.

In S20, the CPU 17 converts the images acquired in S10 into points of views of images included in a composite image to be finally output.

At this time, the images may be adjusted in luminance and color.

The images generated in S20 constitute display images.

In S30, the CPU 17 extracts feature amounts from target regions as targets of acquisition of the feature amounts in the display images converted in S20.

In S40, the CPU 17 determines the display mode of the boundary image according to the feature amounts extracted in S30 by the method described above with reference to FIGS. 3 to 7.

In S50, the CPU 17 composites the feature amounts in the display mode determined in S40 and the display images changed in point of view in S20 to generate a composite image.

In S60, the CPU 17 outputs the composite image generated in S50 to the display 15.

Accordingly, the passenger can see the display 15 to check the surroundings of the vehicle in an easy manner.

Repeating S10 to S60 described above at short time intervals allows the passenger to recognize the conditions of the surroundings of the vehicle in almost real time.

1-3. Advantageous Effects

According to the first embodiment described below in detail, the following advantageous effects can be obtained.

(1a) The information processing device 13 of the present embodiment sets a specific display mode of the boundary image according to the feature amounts of the display images included in the composite image to be output to the display 15.

Accordingly, it is possible to improve significantly the visibility of the display images for the passenger.

(1b) The feature amounts of the display images can be acquired from the regions adjacent to the boundary image.

The feature amounts can be weighted according to the positions in the display images.

Acquiring the feature amounts in this way makes it possible to set the boundary image in a mode appropriate for clarification of the separation between the display images.

(1c) The feature amounts described above are parameters for brightness or color. Accordingly, determining the display mode of the boundary image based on these parameters makes the visibility of the composite image preferable for the passenger.

2. Other Embodiments

An embodiment of the present disclosure has been described so far. The present disclosure is not limited to the foregoing embodiment but can be modified in various manners.

(2a) In the foregoing embodiment, the display system 1 is configured such that acquired images of the surroundings of the vehicle are displayed on the display 15 installed in the vehicle. Alternatively, the display system 1 may be a system for displaying images other than images of the surroundings of the vehicle.

The display system may be a system for use in places other than vehicles.

(2b) In the foregoing embodiment, the composite image has the boundary image disposed only between the display images. However, the boundary image may extend to other portions as long as the boundary image is displayed at least in a region between the display images.

Figure 9:
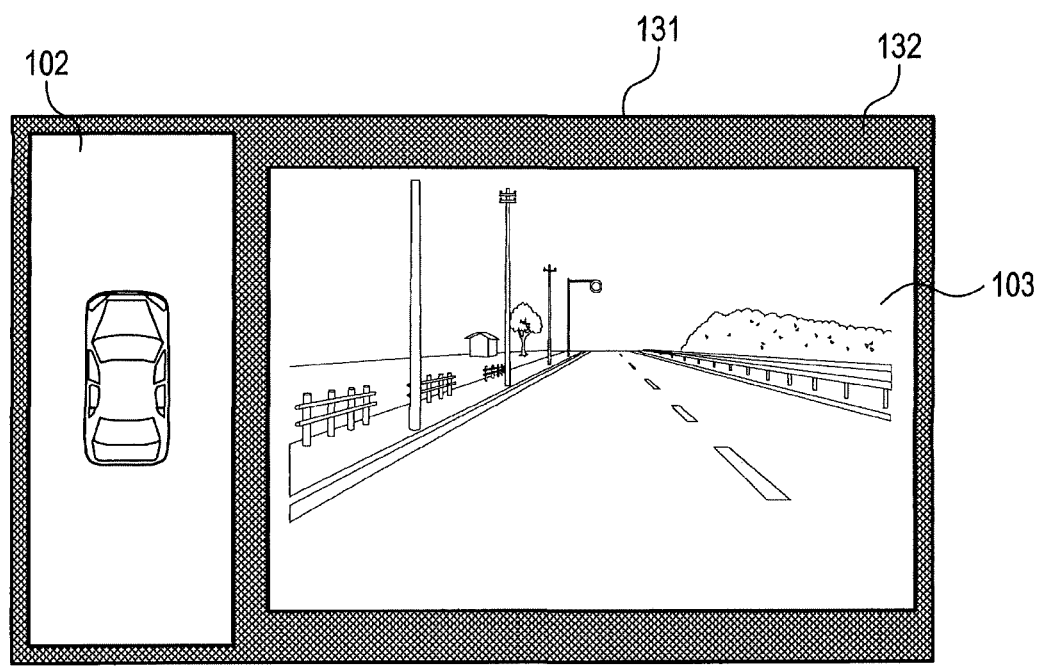
FIG. 9 is a diagram illustrating a modification example of a composite image.

For example, like a composite image 131 illustrated in FIG. 9, a boundary image 132 may be configured to surround a first display image 102 and a second display image 103.

(2c) In the foregoing embodiment, the composite image includes two display images. Alternatively, the composite image may include three or more display images.

Figure 10:
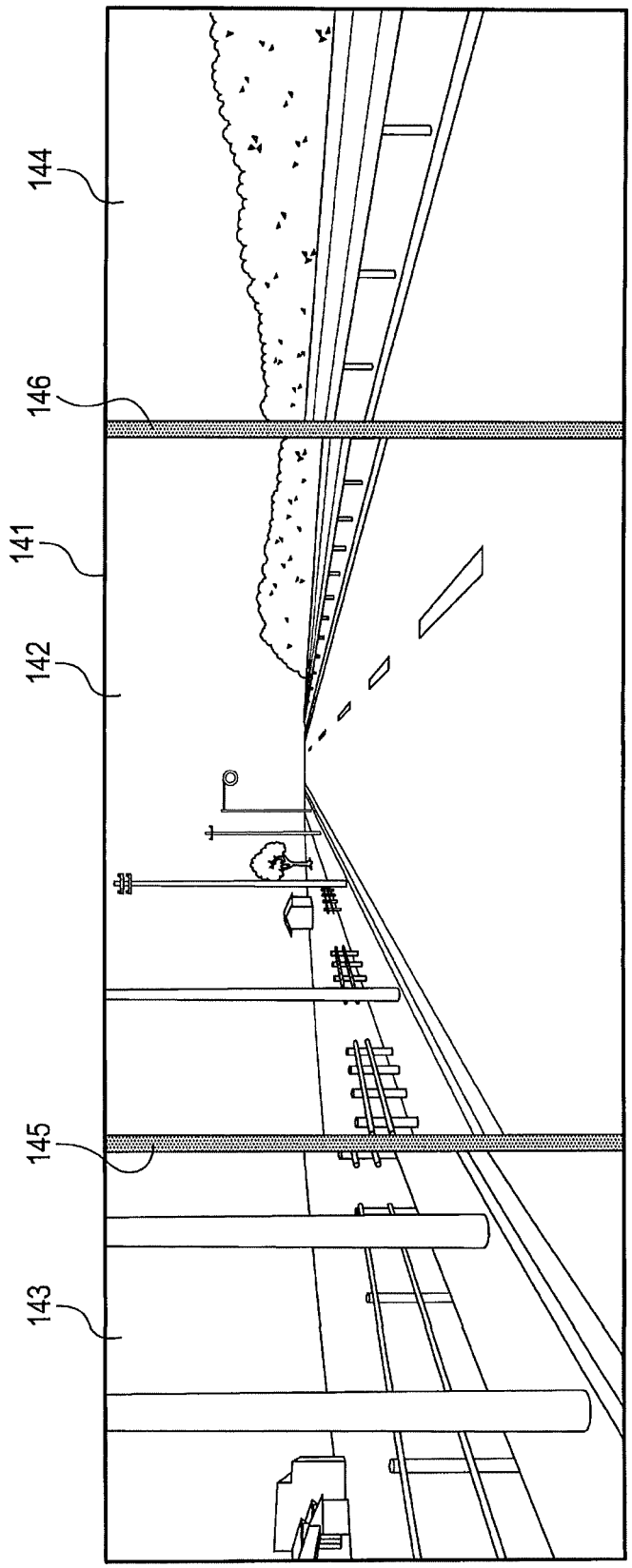
FIG. 10 is a diagram illustrating a modification example of a composite image.

A composite image 141 illustrated in FIG. 10 includes a display image 142 as an image in a point of view oriented to the area behind the vehicle, a display image 143 as an image in a point of view oriented to the area on the left rear side of the vehicle, and a display image 144 as an image in a point of view oriented to the area on the right rear side of the vehicle.

A boundary image 145 is displayed between the display image 142 and the display image 143, and a boundary image 146 is displayed between the display image 142 and the display image 144.

The composite image 141 shows a range corresponding to the range of surroundings of the vehicle that is capable of being viewed by the passenger with the rearview mirror and the side mirror of the vehicle.

The boundary image 145 and the boundary image 146 can clarify the separation between the display images.

(2d) In the foregoing embodiment, the display images are generated based on the images acquired the four cameras 11*a* to 11*d*. However, there is no particular limitation on the number of the cameras but the number of the cameras may be one or two or more.

There is no particular limitation on the number of display images included in a composite image.

The display images can be different in point of view.

When the number of the camera is one, a plurality of images different in point of view can be generated from one acquired image and set as display images.

In this case, the images different in point of view are images different in position and angle of a virtual camera for acquiring display images, which are equivalent to bird's-eye images of the images shot from the front-back direction or images shot in different acquiring ranges, for example.

(2e) A plurality of functions of one component in the foregoing embodiment may be implemented by a plurality of components, or one function of one component may be implemented by a plurality of components.

In addition, a plurality of functions of a plurality of components may be implemented by one component, or one function implemented by a plurality of components may be implemented by one component.

Some of the components in the foregoing embodiment may be omitted.

At least some of the components in the foregoing embodiment may be added to or replaced with other components in the foregoing embodiment.

Any mode included in the technical idea specified by the descriptions of the claims constitutes an embodiment of the present disclosure.

(2f) The present disclosure can be carried out in various forms, besides the information processing device 13 described above, a system having the information processing device 13 as a component, a program for causing a computer to act as the information processing device 13, a non-transitory tangible recording medium such as a semiconductor memory recording this program, and an image synthesis method.

The invention claimed is:

1. An information processing device comprising:
an image acquisition unit configured to acquire images acquired by at least one image acquiring device;
an image processing unit configured to generate a composite image including at least two display images as images based on one or more acquired images acquired by the image acquisition unit and a boundary image displayed at least in a region between the at least two display images; and
an output unit configured to externally output the composite image generated by the image processing unit, wherein
the image processing unit is configured to set a display mode of the boundary image according to a combination of respective predetermined feature amounts of the at least two display images included in the composite image,
the feature amounts include at least one of a parameter indicating brightness and a parameter indicating color,
the image processing unit calculates the feature amounts in a plurality of regions divided from at least one of the at least two display images and adds up the calculated feature amounts in the plurality of regions depending on weights set to the plurality of regions to calculate a feature amount of the at least one of the at least two display images,
the weights set to the plurality of regions vary according to a position of a pixel of a respective feature amount with respect to the boundary image within a respective region, and
a weight of the respective region increases with increasing distance between the position of the pixel of the respective feature amount and the boundary image within the respective region.

2. The information processing device according to claim 1, wherein
the image processing unit acquires the feature amount in the at least one of the at least two display images in a partial region of a display image adjacent to the boundary image.

3. The information processing device according to claim 1, wherein
the image processing unit sets the display mode of at least one of a shape and a display color of the boundary image according to the feature amounts.

4. The information processing device according to claim 1, wherein
the feature amounts include at least the parameter indicating brightness, and
the image processing unit sets the display mode of a shape of the boundary image according to a combination of respective brightnesses of the at least two display images.

5. The information processing device according to claim 1, wherein
the image acquiring device is configured to acquire surroundings of a vehicle, and
the information processing device is installed in the vehicle.

6. A program for causing a computer to implement:
an image acquisition function configured to acquire images acquired by at least one image acquiring device;
an image processing function configured to generate a composite image including at least two display images as images based on one or more acquired images acquired by the image acquisition function and a boundary image displayed at least in a region between the at least two display images; and
an output function configured to externally output the composite image generated by the image processing function, wherein
the image processing function sets a display mode of the boundary image according to a combination of respective predetermined feature amounts of the at least two display images included in the composite image,
the feature amounts include at least one of a parameter indicating brightness and a parameter indicating color,
the image processing function is configured to calculate the feature amounts in a plurality of regions divided from at least one of the at least two display images and add up the calculated feature amounts in the plurality of regions depending on weights set to the plurality of regions to calculate a feature amount of the at least one of the at least two display images,
the weights set to the plurality of regions vary according to a position of a pixel of a respective feature amount with respect to the boundary image within a respective region, and
a weight of the respective region increases with increasing distance between the position of the pixel of the respective feature amount and the boundary image.

* * * * *